(No Model.)

A. A. AMES.
BICYCLE SUPPORT.

No. 578,307. Patented Mar. 9, 1897.

Witnesses
James F. Duhamel
K. A. Nau

Inventor,
Andrew A. Ames,
by John Wedderburn
Attorney

UNITED STATES PATENT OFFICE.

ANDREW ALMON AMES, OF DOVER, NEW HAMPSHIRE.

BICYCLE-SUPPORT.

SPECIFICATION forming part of Letters Patent No. 578,307, dated March 9, 1897.

Application filed June 12, 1896. Serial No. 595,333. (No model.)

*To all whom it may concern:*

Be it known that I, ANDREW ALMON AMES, a citizen of the United States, residing at Dover, in the county of Strafford and State of New Hampshire, have invented certain new and useful Improvements in Bicycle-Supports; and I do hereby declare the following to be a full, clear, and exact description of the invention, such as will enable others skilled in the art to which it appertains to make and use the same.

This invention relates to bicycle-supports.

My object is to provide an improved bicycle-support which may be carried by the machine and be adapted for easy manipulation by the rider.

The invention consists of certain improvements and combinations, as will appear more fully hereinafter.

Figure 1:
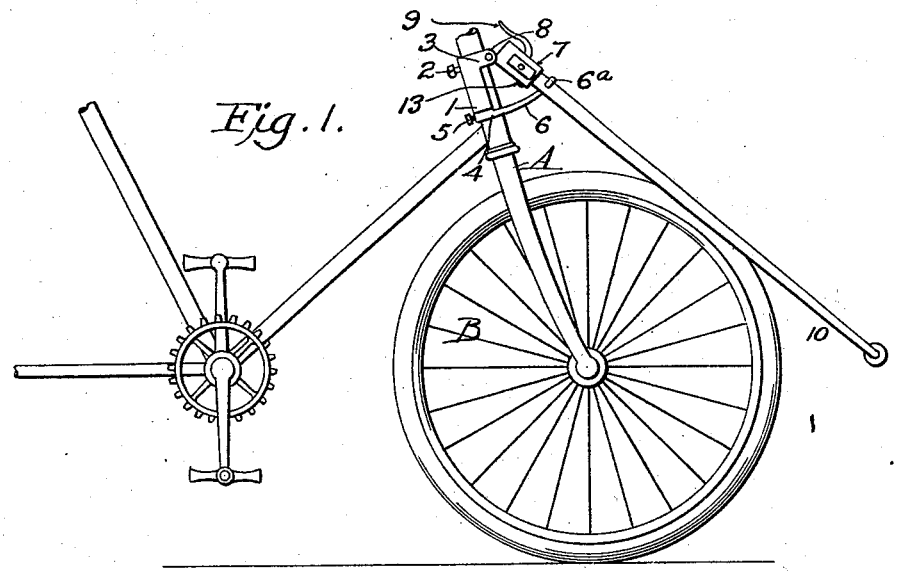
Figures 2, 3:
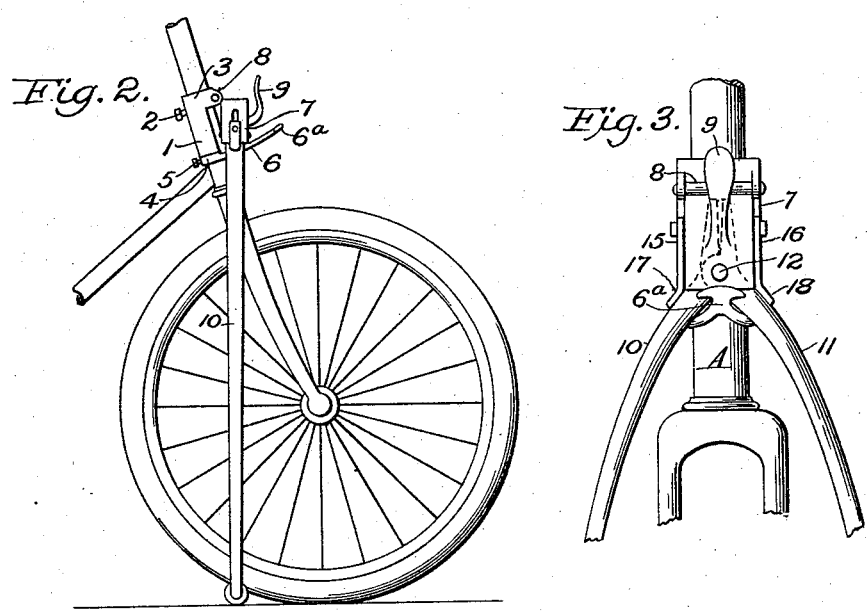
Figure 4:
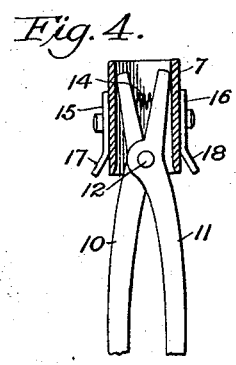

In the accompanying drawings, Figure 1 is a side elevation of a bicycle equipped with my bicycle-support; Fig. 2, a like view, but showing the invention in use; Fig. 3, a front elevation, and Fig. 4 a sectional detail view showing the connection between the supporting-legs.

My invention now to be described is capable of application to the rear frame of the bicycle as well as the front frame, but the latter application is shown in the accompanying drawings.

A designates the steering-tube, and B the front wheel, of an ordinary bicycle.

A sleeve 1 is adapted for adjustment along the steering-tube and is held in position by a set-screw 2. This sleeve is cut in half longitudinally for nearly its entire length, thus leaving a cylindrical head 3.

A spreader consisting of a curved slide 4, slidable on the steering-tube and held in position by a set-screw 5 and provided with a curved spreading-shoe 6, having hooks 6ª, serves a purpose described later on.

A housing or casing 7 has its upper end hinged to the head 3 by a hinge 8 and is provided with an operating-handle 9. Curved supporting-legs 10 and 11, carrying rollers on their lower ends, are pivoted to the casing at 12 and 13, respectively. The upper ends of these legs are connected by a spring 14, which tends to hold them together and out of the way, as shown in Fig. 1. In this position they rest on the front end of the spreader and are grasped and held in position by the hooks 6ª.

I employ two slides 15 and 16, having lugs 17 and 18 on their inner faces and adapted for movement up and down on the casing or housing 7. The lugs act as abutments to prevent the legs from spreading too far when the support is used.

The operation is as follows: When it is desired to support the bicycle, the handle 9 is grasped and the supporting-legs forced back on the spreader. This causes the legs to diverge against the action of the spring until they strike the ground, whereupon the bicycle is held in upright position.

When it is desirable to again use the bicycle, the legs are drawn forward by means of the operating-handle and closed.

Having thus described the invention, what is claimed as new is—

1. In a bicycle-support, the combination with the bicycle-frame, of a casing or housing hinged thereto, supporting-legs pivoted to the casing, a spreader for spreading said legs when they are forced thereon, adjustable slides adapted to engage with the legs and prevent the latter from spreading too far, and means for locking the slides in adjusted position, substantially as described.

2. In a bicycle-support, the combination with a casing or housing hinged to the bicycle-frame, of a pair of supporting-legs pivoted to the casing, a spring for keeping the free ends of said legs normally together, and a spreader adapted to open or spread the legs when they are made to straddle it, said spreader being formed into hooks which receive the legs and hold them in raised position and out of engagement with the spreader when the support is not in use.

In testimony whereof I have signed this specification in the presence of two subscribing witnesses.

ANDREW ALMON AMES.

Witnesses:
 FRANK E. GARSIDE,
 HARRY L. ADDITON.